UNITED STATES PATENT OFFICE.

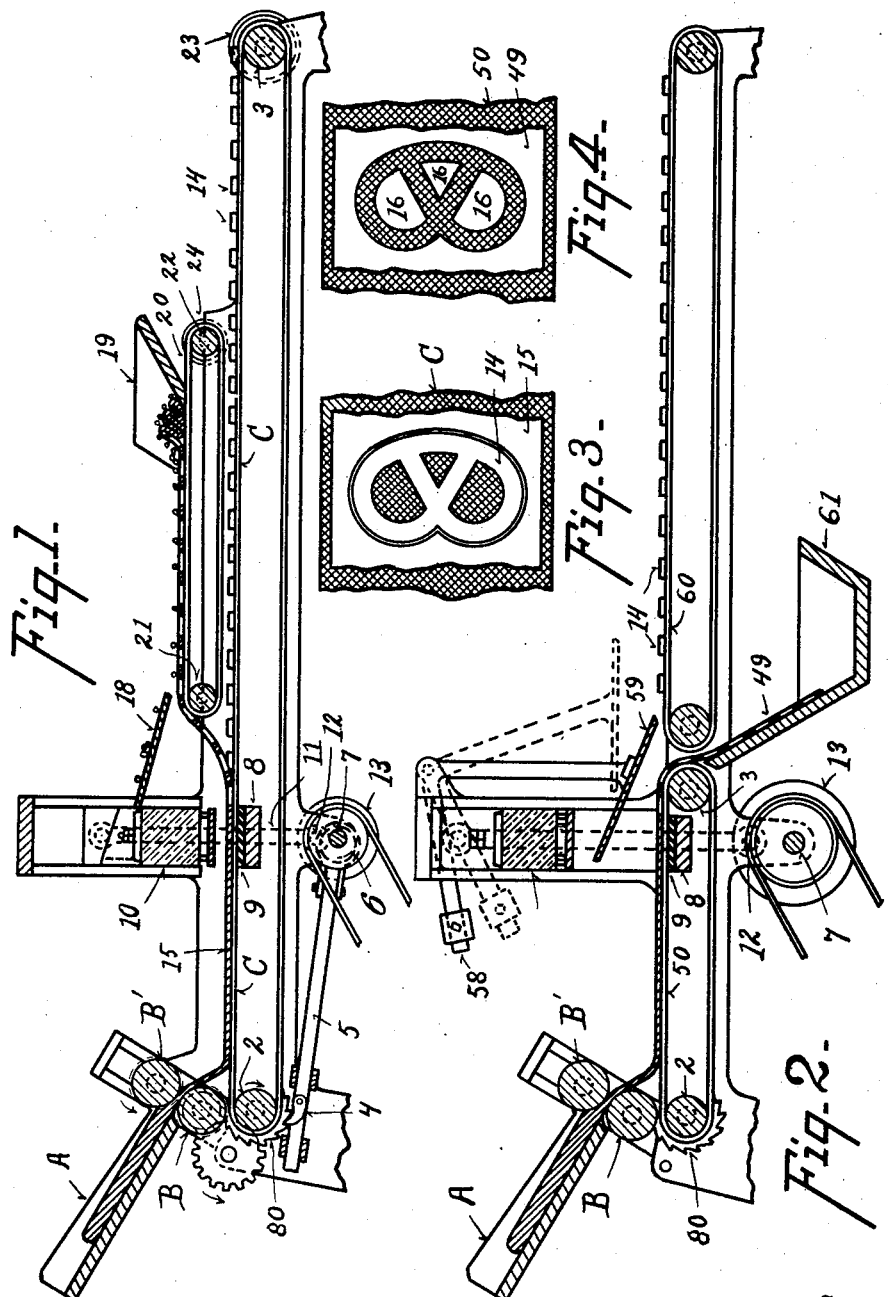

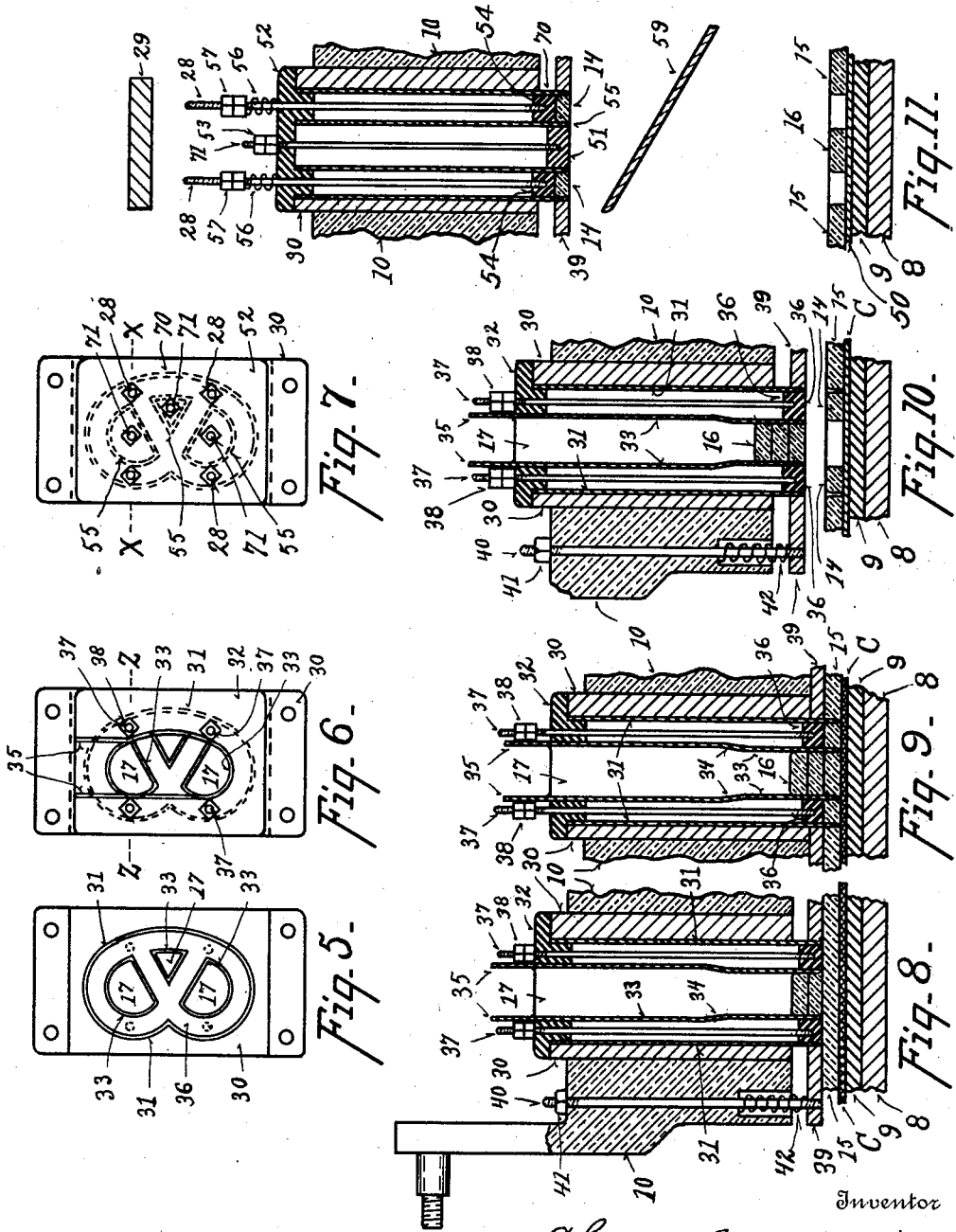

CHARLES LAUKHUFF, OF CINCINNATI, OHIO.

DOUGH-TREATING MECHANISM.

998,017.   Specification of Letters Patent.   Patented July 18, 1911.

Application filed March 22, 1911. Serial No. 616,108.

*To all whom it may concern:*

Be it known that I, CHARLES LAUKHUFF, a citizen of the United States, residing at Cincinnati, in the county of Hamilton and State of Ohio, have invented certain new and useful Improvements in Dough-Treating Mechanism, of which the following is a specification.

My invention relates to improvements in dough treating mechanism.

One of its objects is to provide improved mechanism whereby articles may be cut from sheets of soft dough and portions, termed trimmings, removed from the body of said articles and whereby the finished articles may be separated from the sheet scraps and the trimmings.

Another object is to provide improved dies and die actuating mechanism to attain said results in regular sequence.

My invention further consists in certain details of form, combination and arrangement, all of which will be more fully set forth in the description of the accompanying drawings, in which:

Figure 1 is a longitudinal vertical section through a mechanism embodying my invention. Fig. 2 is a similar view illustrating a modification. Fig. 3 is a plan view of the dough sheet after the dies of Fig. 1 have acted thereon. Fig. 4 is a plan view of the dough sheet after the dies of Fig. 2 have acted thereon. Fig. 5 is a bottom plan view of the dies of Fig. 1. Fig. 6 is a top plan view of the dies of Fig. 1. Fig. 7 is a top plan view of the dies of Fig. 2. Fig. 8 is a section on line z z of Fig. 6 illustrating the position of the die parts when ready to cut. Fig. 9 is a similar view at the limit of the cutting operation. Fig. 10 is a similar view at the limit of the upward movement of the dies. Fig. 11 is a section on line x x of Fig. 7 with the dies nearing the limit of their upward movement.

The accompanying drawings represent the preferred embodiment of my invention, which is designed to produce articles such as pretzels for instance from what is termed soft or yeast dough as distinguished from stiff dough such as is employed for crackers and similar articles, such soft or yeast dough being more difficult to treat mechanically due to its soft yielding nature and its liability to adhere to the mechanism.

In the accompanying illustrations, A represents a dough hopper.

B B' represent positively driven rolls, one of which is adjustable to and from the other, and which rolls serve to roll the dough into a sheet of the desired thickness which falls upon an endless canvas apron C supported by rolls 2, 3. The roll 2 is intermittently driven by a pawl 4 carried by an eccentric rod 5 driven by an eccentric 6 on shaft 7, said pawl engaging a ratchet wheel on the shaft of roll 2. The apron C passes over a supporting bar 8 on which is a rubber pad 9. A vertically reciprocating crosshead 10 is actuated by means of links 11 connected to crank pins 12 on the crank wheels 13 carried at opposite ends of shaft 7.

The cross-head 10 carries one or more dies adapted to sever the articles 14 from the sheet of dough 15 and also to sever portions 16, hereafter termed "trimmings," from the body of said articles.

As illustrated in Figs. 1, 8, 9, the trimmings are adapted to be successively forced through the passages 17 of the dies and to be conducted by a hopper or conduit 18 to a scrap receptacle 19 from which the scrap is from time to time returned to the dough hopper A. After the articles have been severed from the sheet they remain upon and are fed to the end of apron C, while the perforated portion of the sheet or sheet scrap, is lifted upon an apron 20 supported upon rolls 21, 22, where it is fed into the scrap hopper or accumulator 19, from which it is gathered together with the trimmings and molded together and returned to hopper A. The apron 20 may be driven by means of a belt between pulleys 23 24 on the shafts of rolls 3 and 22, or the roll 22 may be independently driven.

The dies by means of which the articles are severed each comprise a die block or supporting member 30 preferably detachably secured to the cross-head 10 and have a vertical perforation of the outline of the article to be cut. Closely fitting said perforation is a knife 31, preferably of sheet metal and of the outline of the article to be cut. This knife is attached at its upper end by soldering or otherwise to a detachable plate 32. Separate sheet metal dies or knives 33 of the outline of the trimmings are also secured to plate 32 with openings at their upper ends and fenders 35 to conduct the trimmings to the inclined conduit 18. The knives 33 are preferably provided with an offset 34 causing their upper end to be of greater diameter than their lower ends to facilitate the upward feed of the trimmings therein.

At the lower end of the knives is a follower 36 of the pattern of the article to be cut, which is supported loosely within the knife 31 and in turn serves to laterally support and position the lower ends of the knives 33. The follower 36 is supported by means of rods 37 from plate 32 by means of nuts 38 resting upon the upper end of plate 32 when the follower 36 is in its lower position as shown in Fig. 8. A sheet detaching plate 39 is yieldingly supported a short distance below the cross-head 10 and die block 30 by means of a plurality of rods 40 and nuts 41 bearing upon the upper face of the cross-head. Springs 42 seated in recesses in the cross-head serve to yieldingly hold plate 39 away from the cross-head. Plate 39 is perforated to correspond to the outline of the article to be cut and to receive the lower end of the knife or knives 31.

As the cross-head 10 descends the plate 39 and follower 36 rest upon the sheet of dough while the knives 31, 33 descend and cut through the sheet of dough. As the knives 31, 33 are lifted the plate 39 and follower 36 by its weight, hold the dough in contact with the apron 2 while the trimmings are carried up with the knives 33, and as successive cuts are made are fed out at the top of the openings in knives 33. The articles remaining on the apron 2 are finally discharged at the end of apron 2, from whence they are carried away to be finally baked, while the sheet scrap is lifted to apron 20 without disturbing the articles, where the sheet scrap accumulates and is returned to hopper A.

In the modification Figs. 2, 7, and 11, the sheet scrap 49 is left upon the apron 50 which corresponds to the apron C of Fig. 1, and the trimmings are held upon apron 50 by means of the weight of followers 51 within the knives 55, which followers are supported from the plate 52 corresponding to plate 32 of Fig. 8, by rods 71 and nuts 53. Followers 54 of the pattern of the articles and located between the knives 70 and 55 are supported by means of rods 28 having springs 56 and nuts 57, which serve to hold the followers 54 in raised position so as not to leave the articles upon the apron 50, but to carry them upward with the dies. As the cross-head nears the limit of its upward movement it rocks a crank arm 58 which shifts an inclined conduit 59 into position beneath the die to receive the articles, while the upper end of rods 28 contact with a stationary plate 29 causing the follower 54 to push the articles free from the knives and to drop them upon the conduit 59 which conducts them to an apron 60 which conveys the articles away to be baked.

The sheet scraps and trimmings are conducted from the apron 50 to a hopper or receptacle 61.

The dies are capable of being readily constructed and assembled or renewed, and are easily detachable and accessible. The dies may be variously modified, particularly as to vertical depth from that shown in the drawings. The mechanism herein illustrated is capable of considerable modification without departing from the principle of my invention.

Having described my invention, what I claim is:

1. A dough treating die adapted to cut articles from a sheet of dough and to sever said articles into two portions, said die comprising a severing member to sever the article from the sheet, a severing member to divide the article into two portions, a member to detach the sheet scrap from said article severing member, a member to detach one portion of the article from its severing member and to leave it with the sheet scrap, and means to subsequently detach the remaining portion of the article from its severing member.

2. A dough treating die adapted to cut articles from a sheet of dough and to cut a portion from the interior of said articles, said die comprising a severing member to sever the article from the sheet, a severing member to sever an interior portion from the article, a member to detach the sheet from said article severing member, and means to detach the article portion and the interior portion severed therefrom so that the article portion and the severed interior portion will travel different paths, and one of said portions be left with the sheet portion.

3. In a dough treating mechanism an apron adapted to feed a sheet of dough, a die adapted to sever articles from said sheet and to sever said articles into a plurality of portions, mechanism to detach the sheet scrap from said die so as to leave the sheet scrap on said apron, mechanism to detach one portion of said articles so as to leave it with the sheet scrap upon said apron, said die being adapted to carry the remaining portion of the articles away from said apron.

4. In a dough treating mechanism, an apron adapted to feed a sheet of dough, mechanism to intermitently drive said apron, a reciprocating die adapted to sever articles from said sheet and to sever said articles into a plurality of portions, mechanism to detach the sheet scrap from said die so as to leave the sheet scrap on said apron, mechanism to detach one portion of said articles so as to leave it with the sheet scrap upon said apron, said die being adapted to carry the remaining portion of the articles away from said apron.

5. In a dough treating mechanism, an apron adapted to feed a sheet of dough, a die adapted to sever articles from said sheet and to sever said articles into a plurality of parts, mechanism to detach the sheet scrap from said die so as to remain on said apron, mechanism to detach one of the article portions so as to remain with the sheet scrap on said apron while another portion of the article is carried away from said apron by the die, and mechanism to subsequently detach the sheet scrap from said apron without disturbing said article portions carried by said apron.

6. In a dough treating mechanism, an apron adapted to feed a sheet of dough, a die adapted to sever articles from said sheet and to sever said articles into a plurality of parts, mechanism to detach the sheet scrap from said die so as to remain on said apron, mechanism to detach one of the article portions so as to remain with the sheet scrap on said apron while another portion of the article is carried away from said apron by the die, and mechanism to lift said sheet scrap from said apron without disturbing said article portions carried by said apron.

7. In a dough treating die adapted to sever articles from a sheet and to sever said articles into a plurality of parts, a die supporting member having a recess of the exterior outline of the article to be severed, a sheet metal severing die of the outline of the article to be severed, a sheet metal severing die of the outline of one of the portions or divisions of said article, located within said first mentioned severing die, said severing dies being rigidly attached to said supporting member, a sheet scrap detaching member having a recess to receive the forward end of said first mentioned severing die, said sheet scrap detaching member being yieldingly supported in front of said die supporting member, and an article detaching member seated within said first mentioned severing die and yieldingly supported with reference to said die supporting member, said article detaching member being adapted to detach one portion of said article from said severing dies.

8. In a dough treating die adapted to sever articles from a sheet and to sever said articles into a plurality of parts, a die supporting member having a recess to receive and support severing dies, a severing die of the outline of the article to be severed from the sheet, a severing die of the outline of one of the portions or divisions of said article, located within said first mentioned severing die, said severing dies being rigidly attached to said supporting member, a sheet scrap detaching member having a recess to receive the forward end of said first mentioned severing die, said sheet scrap detaching member being yieldingly supported in front of said die supporting member, an article detaching member seated within said first mentioned severing die and yieldingly supported with reference to said die supporting member, said article detaching member being adapted to detach one portion of said article from said severing dies while a remaining portion of the article is carried away from the sheet by said die.

9. In a dough treating die adapted to sever articles from a sheet and to sever said articles into a plurality of parts, a die supporting member having a recess to receive and support a severing die, a severing die of the outline of the article to be severed from the sheet supported within the recess of said supporting member, a severing die of the outline of one of the portions or divisions of said article, located within said first mentioned severing die, said severing dies being rigidly attached to said supporting member, a sheet scrap detaching member having a recess to receive the forward end of said first mentioned severing die, said sheet scrap detaching member being yieldingly supported in front of said die supporting member, and an article detaching member seated within said first mentioned severing die and yieldingly supported with reference to said die supporting member, said article detaching member being adapted to detach one portion of said article from said severing dies, and to support the forward portion of said last mentioned severing dies with reference to said first mentioned severing die.

10. In a dough treating die adapted to sever articles from a sheet and to sever said articles into a plurality of parts, a die supporting member having a recess to receive and support a severing die, a severing die of the outline of the article to be severed from the sheet, supported within the recess of said supporting member, a severing die of the outline of one of the portions or divisions of said article, located within said first mentioned severing die, said severing dies being rigidly attached to said supporting member, a sheet scrap detaching member having a recess to receive the forward end of said first mentioned severing dies, said sheet scrap detaching member being yieldingly supported in front of said die supporting member, and a plurality of article detaching members located within said respective severing dies and adapted to detach different portions of the article at different points of the die movement.

11. A dough treating mechanism adapted to sever a sheet of dough to produce portions of three different characters, said mechanism comprising a sheet supporting member, a plurality of severing members adapted to divide the sheet into portions of three different characters, a plurality of members adapted to detach portions of two characters from said severing members so as to leave said two portions together upon said sheet supporting member, and means to separate the remaining portion from the severing members so as to not to rest upon said sheet supporting member.

In testimony whereof I have affixed my signature in presence of two witnesses.

CHARLES LAUKHUFF.

Witnesses:
E. SCOTT KING,
C. W. MILES.